United States Patent [19]

Baker

[11] 4,437,994

[45] Mar. 20, 1984

[54] EXTRACTION OF METAL IONS FROM AQUEOUS SOLUTION

[75] Inventor: Richard W. Baker, Bend, Oreg.

[73] Assignee: The United States of America as represented by the Secretary of the Interior, Washington, D.C.

[21] Appl. No.: 177,976

[22] Filed: Aug. 14, 1980

Related U.S. Application Data

[63] Continuation-in-part of Ser. No. 890,149, Mar. 27, 1978, abandoned.

[51] Int. Cl.³ .............................................. B01D 13/00
[52] U.S. Cl. ..................................... 210/638; 210/651
[58] Field of Search ........................ 210/638, 651, 654

[56] References Cited

U.S. PATENT DOCUMENTS 3,691,068  9/1972  Cross ............................ 210/500.2 X
3,956,112  5/1976  Lee et al. .......................... 210/22 C
4,051,230  9/1977  Miyauchi ........................... 210/22 R Primary Examiner—Frank A. Spear, Jr.
Attorney, Agent, or Firm—William S. Brown; Donald A. Gardiner

[57] ABSTRACT

A process of extraction of ions of metals from an aqueous feed solution and liberation of such in an aqueous product solution wherein the feed solution is circulated through the lumens of hollow fibers, the walls of said fibers consisting of a microporous membrane having the pores filled with an organic liquid comprising a complexing agent, and the ions travel through said walls to be liberated in an aqueous product solution circulated over the outside of the fibers. A preferred embodiment of the process employs an anisotropic microporous membrane having pores of about 0.01 to 0.04 micron in diameter at each surface and larger pores in the interior.

10 Claims, 6 Drawing Figures

ORGANIC / AQUEOUS DISTRIBUTION COEFFICIENT FOR URANYL SULFATE ION VS SALT CONCENTRATION

EXTRACTION OF METAL IONS FROM AQUEOUS SOLUTION

This application is a continuation-in-part of application Ser. No. 890,149, filed Mar. 27, 1978, now abandoned.

BACKGROUND OF THE INVENTION

There is today considerable need for an economical and efficient method of removing ions of metals from solutions in order to effect recovery of the metals. Such a need is presented, for instance, in the extraction of metal ions from ore leach liquors produced by in situ mining or dump leach extraction of copper and uranium. Other examples where such a need is evidenced is in the treatment of industrial water effluent streams, and in the treatment of electroplating rinse baths, where it is desired to recover such ions as iron, nickel, copper, chromium, etc. In some instances, it is desirable to extract a single type of ion, such as the ions of a single metal, and in others an entire class of metals.

Solvent extraction with organic complexing agents has been used in ion recovery processes. However, the cost of such a process is usually high, thereby limiting application of the process to only a few favorable situations.

Membranes have also been used in the past in various types of recovery systems. For instance, membranes have been employed in a so-called solution-diffusion process. In this process, transport through the membrane occurs by reason of dissolution of the permeating species in the membrane at one interface and diffusion down a gradient in thermodynamic activity. A problem inhibiting wide acceptance has been the lack of sufficient selectivity, and a low transport rate across the membrane. A process known as "facilitated transport", utilizing a membrane to effect separation, is also known. A problem with this type of process is that it is limited to neutral species. As a consequence, so-called facilitated transport in general has been applied only to the separation of gases.

Coupled transport refers to another process, similar to but less understood than facilitated transport, which may be employed to effect ion removal from an aqueous solution with the ion transported across a membrane. Coupled transport, as described in greater detail below, employs a membrane impregnated with a liquid which includes a complexing agent. In a coupled transport process electrical neutrality is preserved by the movement of other ions through the membrane in addition to the ions that are being recovered.

SUMMARY OF THE INVENTION

The present invention provides an improved coupled transport process for effecting removal of ions from an aqueous feed solution and their subsequent liberation in an aqueous product solution, where the feed solution is circulated through the lumens of elongate hollow fibers having microporous walls, the fiber walls retaining an organic water-immiscible liquid comprising a complexing agent, and the aqueous product solution being circulated over the outside of the fibers. A number of significant advantages and results are obtained by the process of the invention. A high surface-to-volume ratio is provided the feed solution, rendering it possible to maintain a relatively high velocity of the feed solution down the lumens of the fibers, which velocity is effective in circumventing concentration polarization problems, and in lowering the residence time of the feed solution in the fibers. The use of hollow fibers as contemplated furthermore has the advantage of permitting the use of very thin walls between the feed and product solutions, which is advantageous in increasing flux rates. The thin-walled fibers are capable of maintaining their integrity for a longer time and under more extreme operating conditions than is possible, for example, with thin-walled flat sheet membranes. The use of hollow fibers as contemplated also provides a high surface area in relation to the space taken up by the system as a whole.

According to the invention, the internal diameter of the fibers contemplated is less than about 100 mils and preferably a diameter is selected which is between about 5 and 50 mils. With internal diameters of less than about 5 mils, fouling with trapped particulate impurities in the feed solution may become a problem. The wall thickness of the fibers generally is no more than about 20 mils, and preferably is selected to be 10 mils or less.

The foregoing and other advantages are attained by the invention, as will be apparent from the hereinafter description, which is to be taken in conjunction with the accompanying drawings, wherein.

DETAILED DESCRIPTION OF THE INVENTION

Figure 1:
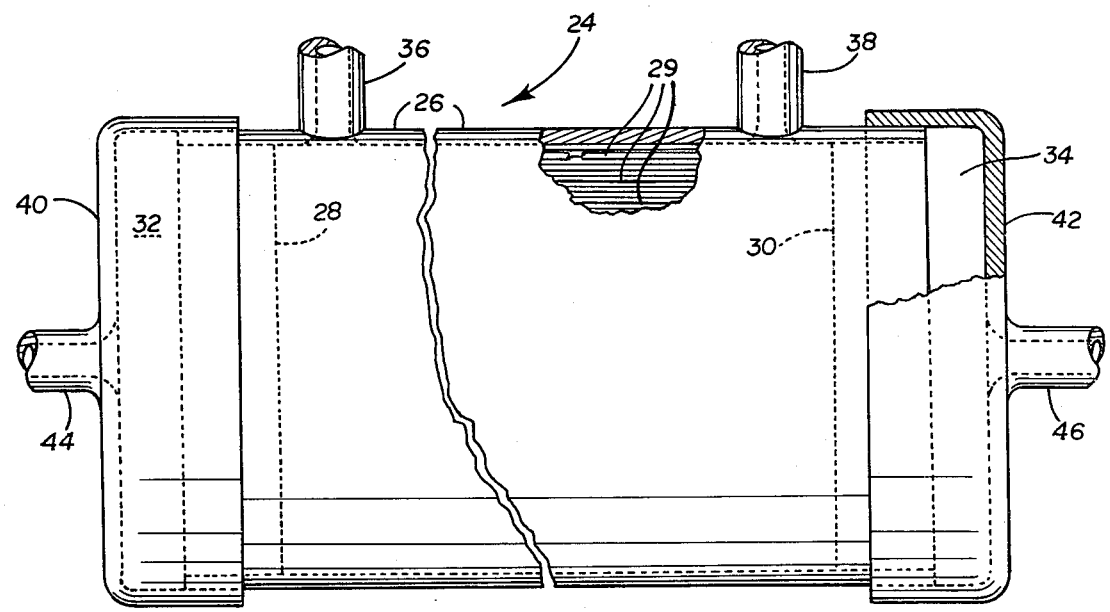
FIG. 1 is a simplified drawing of apparatus suitable for practicing the invention, including a module provided with a multiplicity of hollow fibers used in circulating the aqueous feed solution.

Coupled transport has been referred to above as a process in which ions are removed from one aqueous solution and transferred through a membrane, subsequently to be liberated in another aqueous solution which is separated from the first solution by this membrane. Coupled transport may occur following either a counter-transport mechanism, or a co-transport mechanism.

The counter-transport mechanism, when such is followed in a coupled transport process, may be illustrated by the following equation:

$$A + BC \rightleftharpoons AB + C. \tag{1}$$

A and C are ions in the feed and product solutions. A represents the ions of interest in the feed solution which it is desired to remove and to transfer to the product solution, and co-ions C having like charge to ions A are the ions transferred to the feed solution to maintain electrical neutrality. Following the counter-transport mechanism, the complexing agent B in the membrane separating the two solutions forms a complex AB at the feed side of the membrane which then diffuses to the product side of the membrane where the reaction is reversed by the high concentration of ion C. Ion A is liberated to the product solution and a complex BC is formed of the complexing agent B and ion C which then diffuses back to the feed solution. The complexing agent B thus acts as a shuttle picking up ions on one side of the membrane, carrying them across to the other side, and preserving requisite electrical neutrality by carrying a co-ion in the opposite direction. The energy for the shuttle process is provided principally by the concentration gradient of co-ion C. The process will take place even if the concentration gradient for the transport of ion A is small (or even negative), provided there exists a sufficiently large gradient of the co-ion C.

Coupled transport following a so-called co-transport mechanism is illustrated by the following equation:

$$A + D + E \rightleftarrows ADE \qquad (2)$$

A as before represents the ions of interest in the feed solution. D represents so-called counter-ions having a charge opposite to the charge of ions A, also present in the feed solution. Following so-called co-transport, complexing agent E in the membrane forms a complex ADE with the ions in the feed solution and this diffuses to the product side of the membrane. At the product side, the complex dissociates because of the reduced concentration of ion D in the product solution, with the liberation of both A and D to the product solution. Complexing agent E diffuses back to the feed side of the membrane. Provided a sufficiently large concentration difference of D exists across the membrane, ion A will flow into the product solution even if the concentration of A there is greater than in the feed solution. The process is referred to as co-transport because the ion of interest and the counter-ion flow together across the membrane.

In practicing the invention, a cell or module may be utilized which includes a multiplicity of hollow fibers, with means provided whereby the aqueous feed solution may be directed into the lumens of the fibers at one set of their ends, and then collected after traveling the lengths of the fibers to the opposite sets of ends of the fibers. The cell further includes means for confining the aqueous product solution as it is directed through the cell about the outer sides of the fibers. The fibers have microporous walls which constitute support membranes in the cell. A water-immiscible organic liquid comprising a complexing agent fills the pores of the walls of the fibers. Ion removal from the feed solution occurs with the complexing agent forming a complex with the ion of interest in the feed solution, this being followed by diffusion of the complex through the organic liquid permeating the walls of the fibers. Coupled transport occurs, utilizing either a co-transport mechanism or a counter-transport mechanism.

The Fibers Forming the Support Membrane

The fibers of the support membrane should be composed of a material which is chemically stable to both the feed and product solutions, which are frequently (but not always) strongly acidic or alkaline. The material also should be chemically and physically resistant to the organic liquid filling the pores of the fiber walls. Preferred materials for the composition of the fibers are inert polymers such as polyethylene, polypropylene, polysulfone, polytetrafluoroethylene, and polyphenylene oxide.

The walls of the fibers are highly porous, and finely porous. There are of course practical upper limits to porosity, but fibers with good mechanical integrity are available with porosities ranging from 30 to 60% or more.

The pores in the walls of the fibers should also be quite fine, in order to retain the organic liquid by capillarity for long periods of time—several weeks to several years—without "weeping" or "bleeding" of the organic liquid into the solutions being processed. If the organic liquid is displaced from some of the pores by water from the adjacent solutions, these water-filled pores will act as short circuit pathways, reducing the efficiency of the process. The capillary force holding a liquid inside a pore is inversely proportional to pore size. This force should be sufficient to maintain the organic liquid in the pores against the pressure differentials that may exist because of a necessity, for example, of circulating the feed and product solutions through the insides and over the outsides of the fibers, respectively. In a practical application, such a pressure differential could be in the range of 10 psi or more.

The diameter of the pores in the fiber walls preferably should fall within the range of about 0.01 to 10 microns. Thus if the pores are smaller than about 0.01 microns in diameter, the fiber walls are too finely porous to permit free passage of the ion complex therethrough. If the pores are substantially greater than about 10 microns in size, however, overpressure on the feed or product solution side of the fibers may tend to force the organic liquid out of the pores and create a short circuit path.

Additionally, and in accordance with a preferred embodiment of the invention, it has been found that anisotripic membranes, i.e., membranes characterized by a graded pore size, are particularly effective in the process of the invention, use of such membranes making possible the achievement of both high flux and stability. Typically, these membranes have pores of about 0.01 to 0.04 micron in diameter at each surface, but much larger pores, of about 2 to 10 microns in diameter, in their interior. With such membranes, having small pores at each surface, it is possible to maintain the organic liquid within the membrane for a prolonged time. However, the two surface layers containing the small pores are very thin, typically 0.1 to 0.01 mil, compared to the central region containing the large pores, and the surface layers, therefore, do not substantially effect the passage of the metal complex through the membrane. This is in contrast to small-pore isotropic membranes, in which the small pores substantially hinder passage of the complex, and to large-pore isotropic membranes, which are unstable because the capillary forces are insufficient to maintain the organic liquid within the pores for an extended period of time, e.g., more than a few days.

A further requirement placed on the fibers is that they be composed of a hydrophobic material, which has a high surface tension against water, in order that water not spontaneously displace the organic liquid which permeates the fiber walls. Wall surfaces in the fibers, thus, should have a greater affinity for the organic liquid than for water.

To obtain high fluxes through the walls of the fibers, the walls should be relatively thin, not more than about 20 mils thick, and preferably having a thickness of about 10 mils or less. With the membrane structure separating the feed and product solutions taking the form of walls of fine hollow fibers, considerable strength is imparted to the membrane structure. For instance, fibers having a thickness on the order of 2 to 3 mils are strong enough to withstand burst pressures of several hundred psi. In order to achieve requisite strength, it is contemplated that the fibers be made with an internal diameter of less than about 100 mils and preferably within the range of about 5 to 50 mils. Greater strength can be obtained with even smaller diameter fibers, but as already indicated above, fouling may then become a problem.

An advantage which enures to the use of hollow fibers as the support membrane structure is a very favorable surface-to-volume ratio that is obtained with these fibers. For example, with a tube having a diameter of 1 cm, the surface area of the tube per $cm^3$ of liquid contained inside the tube is 4 $cm^2/cm^3$. For a hollow fiber having a diameter of 0.1 cm (40 mils), the surface-to-volume ratio which results from use of the small diameter hollow fibers permits lowering of the residence time required within the hollow fibers to obtain a given degree of reduction in ion concentration. An advantage flowing from a short residence time is the ability to use fiber lengths which are considerably shorter than the lengths required, for instance, with tubes having an internal diameter of, e.g., 1 cm.

Apparatus suitable for practicing the invention is illustrated schematically in FIG. 1. Referring to FIG. 1, a module 24 is shown which includes an elongate cylindrical casing 26 closed adjacent its ends by plugs 28, 30. The support membrane system in the module takes the form of elongate fibers 29 extending between plugs 28, 30, with the lumens or interiors of these fibers communicating through the plugs with spaces 32, 34. Product solution is circulated through the casing and over the outside of such fibers using ports 36, 38 for introducing and exhausting the product solution. Caps 40, 42 close off the ends of the casing outwardly of the plugs, and feed solution may be circulated through the module utilizing ports 44, 46 communicating with spaces 32, 34 which communicate with the interiors of the fibers, as described.

Hollow fibers with microporous walls may be fabricated in a number of different ways. For instance, the polymer employed in making a fiber may first be melted, and the melted polymer then extruded through a spinneret. The melted polymer before extrusion has finely divided material mixed therewith and such material is removed after forming of the fiber in the spinneret by dissolving such in an appropriate solvent in a template leaching process to impart porosity to the wall of the finished fibers. Melt spinning processes are described in U.S. Pat. Nos. 3,532,527 and 3,494,780.

The fibers may also be made employing a solution spinning process and using a tube-in-orifice spinneret system of the type described by I. Cabasso, E. Klein, and J. K. Smith in (J. Appl. Poly. Sci. 20, 2377 (1976)). This spinneret consists of two concentric capillaries. The polymer solution is extruded through the outer capillary while water or other suitable fluid is forced from the inner capillary to form the lumen or bore of the fiber. After a brief air-dry period, the fiber is quenched in a large water bath. A preferred polymer material is polysulfone (P-1700 from Union Carbide). Relatively dilute casting solutions should be used, for example, 12 to 20 wt % solutions in dimethyl formamide, in order to produce optimum microporosity.

Figure 2:
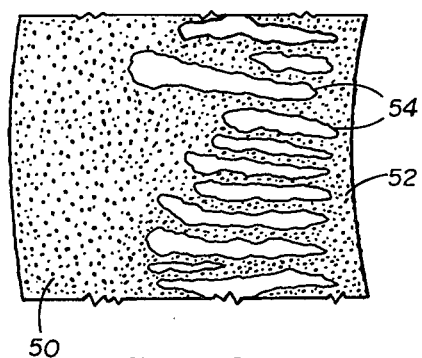
FIG. 2 is a drawing illustrating, on greatly enlarged scale, part of a cross-section of a hollow fiber such as that employed in practicing the invention.

A hollow fiber made by a solution spinnning process as above-described possesses an anisotropic structure, with, in effect, skins about the outside of the fiber and bounding the lumen within the fiber which have pores of relatively small size, and with the wall of the fiber between these inner and outer skins having distributed therein pores of considerably greater size, this being the above-discussed preferred embodiment of the invention. This is illustrated in FIG. 2, which is a drawing made from a scanning electron micrograph of a portion of a cross-section of polysulfone fiber, at 700 times magnification. The relatively finely porous inner and outer skins are shown at 50 and 52. Relatively large pores in the wall of the fiber are located between these inner and outer skins. As discussed above, the anisotropic nature of such a fiber provides important advantages. Optimally, the fiber walls should have very fine pores to maximize the capillary forces which retain the organic liquid within the fiber, but on the other hand the overall porosity should be as high as possible to maximize flux. With most isotropic membranes there is a general tendency for overall porosity to decrease as pore size decreases. This, however, is not the case with the preferred anisotropic fibers. Such fibers typically have an overall porosity of about 50 to 80%, even though the outer and inner skins have pore sizes as low as 0.01 to 0.04 microns.

Ordinarily, the fibers are made in continuous lengths, and then cut to length for assembly into the module or cell illustrated in FIG. 1. In making the module, a number of fibers may be introduced into the tubular shell or casing. Both ends of the shell may then be potted with a suitable compound, such as an epoxy. After the epoxy has set, the excess is trimmed off and both ends of the shell are then sectioned through the potting material exposing the open fiber ends, thus completing the support membrane structure.

The microporous walls of the hollow fibers are impregnated with organic liquid by circulating the organic liquid through the lumens of the fibers for several minutes, during which time the liquid is absorbed by capillarity. Excess liquid is removed, and the module is ready for use.

It is important in practicing the instant invention that the aqueous feed solution be circulated down the lumens of the fibers and the product solution over the outside of the fibers, as in this way concentration polarization which would tend to decrease the flux of the ions of interest from the feed to the product solution is minimized. The effect of concentration polarization is to reduce the permeant concentration gradient and consequently the flux across the membrane. For example, in the coupled transport process described in equation 1, there is a flow of ion A, the ion of interest, from the feed solution to the product solution, and a counterflow of ion C from the product to the feed solution. Because of this flow, there is a tendency for the feed solution immediately adjacent to the membrane surface to become depleted in ion A which is being transported across the membrane, i.e., the fiber wall, and enriched in ion C which is being released from the membrane. Conversely, on the product side of the membrane, the boundary layer is enriched in ion A and depleted in ion C. Because of this effect, the net differences in concentration of species A and C across the membrane are reduced from their bulk solution values. Vigorous agitation reduces these boundary layer concentrations, and it is important in practicing this invention to provide such agitation.

It has been found that while a certain degree of turbulence is required on both sides of the membrane if concentration polarization is to be avoided, the flux of the ion of interest from the more dilute solution, i.e., the feed solution, is much more sensitive to concentration polarization than the flux of the ion from the more concentrated solution, i.e., the product solution. With pumping of the feed solution down the lumens of the fibers, positive flow of the aqueous feed solution over the entire inner wall surfaces of the fibers is insured. In practice, even if the solution on the outside of the fiber is circulated quite rapidly, stagnant areas can exist where polarization may be severe. Typically, flow velocities down the fibers on the order of about 100 to 300 cm/min are used, although in some cases velocities as high as about •cm/min may be required to properly control polarization. On the product side of the fibers the recirculation velocity is much lower, typically about 5 to 50 cm/min.

Water-Immiscible Organic Liquid Comprising Complexing Agent

As already indicated, the pores of the microporous support membranes, i.e., the fiber walls, are impregnated with a water-immiscible organic liquid which comprises a complexing agent. In some cases it may be feasible to employ the complexing agent alone. However, in most instances it will be preferable to dilute the complexing agent with, or dissolve it in, an organic liquid carrier which is a solvent for the complexing agent, as discussed below. Optimum type and amount of carrier may vary greatly depending on the specific complexing agent, support membrane, feed and product solutions, etc., and are best determined experimentally.

The complexing agent should preferentially and reversibly complex with the ion or group of ions in the feed solution which it is desired to remove. The complexing agent and the ion complex which forms should be mutually miscible with each other, and with any other liquid which may form part of the liquid in the pores of the membrane. Obviously, the complexing agent should not be soluble in the feed or product solutions. Solid complexing agents may be used, provided they are dissolved in a suitable water-immiscible liquid carrier. The requirements placed upon the complexing agent used in the process are met by many agents, and a complete listing may be obtained from references on solvent extraction and ion exchange. Particularly useful are *Solvent Extraction in Analytical Chemistry* by G. H. Morrison and H. F. Freiser, John Wiley and Sons, Inc., New York 1957; and *Solvent Extraction Chemistry of Metals*, H. A. C. McKay, T. V. Healy, I. L. Jenkins, and A. Naylor, (Eds.), McMillan and Sons Publisher, London, 1965.

The choice of agent for a given separation or concentration process, and the mode of operation, i.e., countertransport or co-transport, will depend on the ion or ions to be processed, on the conditions of the feed stream, and on the required separation and concentration factors. By proper selection of the complexing agent, high separation and concentration factors can be achieved without resorting to extreme gradients of, for example, pH or ionic strength to drive the process.

A useful parameter in making the selection of complexing agents is the distribution coefficient, K, for the particular ion of interest, defined as:

$$K = \frac{\text{Concentration of ion in organic phase}}{\text{Concentration of ion in aqueous phase}}$$

Where an aqueous feed solution is separated from an aqueous product solution by a separator membrane system, including those contemplated by the invention, a distribution coefficient for the ion of interest may be calculated for the feed side of the membrane, relating concentration of the ion in the organic liquid phase to the concentration of the ion in the aqueous feed solution. A distribution coefficient may also be determined for the product side of the membrane, relating the concentration of the ion of interest in the organic liquid phase to the concentration of the ion in the aqueous product solution. In carrying out this invention, it is preferred that the distribution coefficient for the ion of interest on the feed side of the membrane be greater than 2, and that this distribution coefficient be at least twice the distribution coefficient existing on the product side of the membrane.

Figure 3:
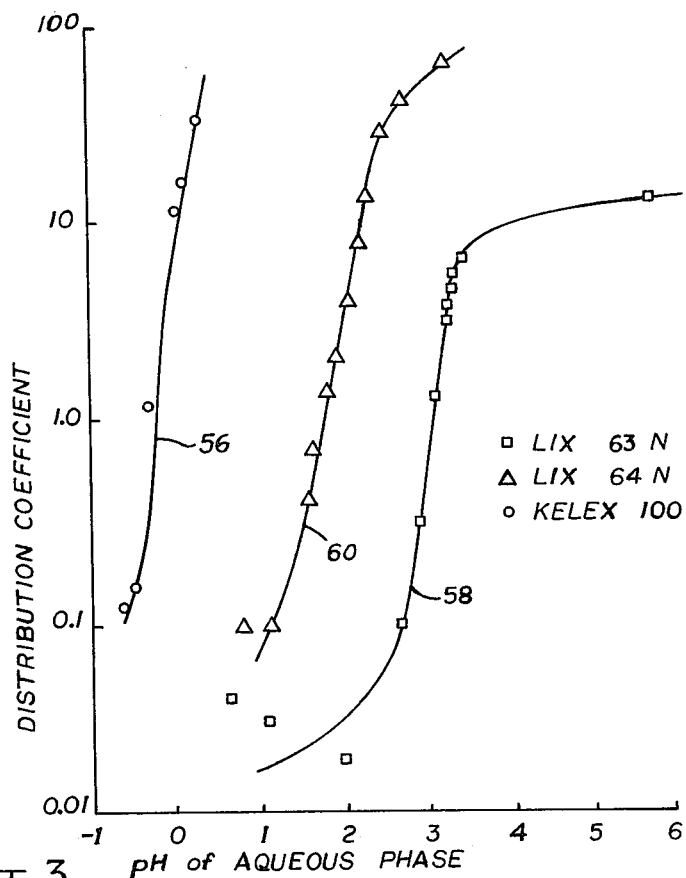
FIGS. 3-6 are graphs referred to in the description.

Typical distribution coefficient data for the copper ion, as a function of the pH of the aqueous phase, is charted in FIG. 3 with respect to several commercially available water-immiscible organic complexing agents diluted to 10 volume percent with kerosene. In determining the distribution coefficient data, a concentration of 2,000 parts per million copper was utilized in the aqueous phase. K values were obtained by straightforward solvent extraction of the metal ion with the organic complex phase. Line 56 in FIG. 3 represents data obtained with Kelex 100, which is a liquid complexing agent comprising a substituted 8-hydroxyquinoline of the following general formula:

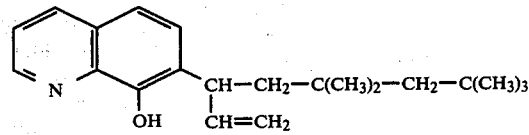

Line 58 represents data obtained with LIX 63N, a liquid complexing agent having the following formula:

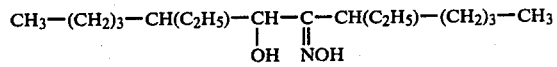

Line 60 represents data obtained with LIX 64N, a liquid complexing agent which is a mixture of about 5% LIX 63N and about 95% hydroxyoxime having the following formula:

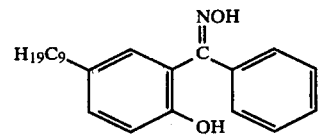

dissolved in approximately an equal amount of petroleum distillate.

The data shown in FIG. 3 is helpful in making the selection of which complexing agent to use in a particular process. By way of example, consider the process of recovering copper from an electroplating rinse bath. The rinse bath is typically at pH 2.5 and typically contains 0.1 wt % copper. The plating bath is at pH 1.5 and contains about 5 wt % copper. The objective is to recover copper from the rinse bath to produce a concentrated solution, one that could be fed directly back to the plating bath, and a dilute solution that could be discharged to the sewer. Referring to FIG. 3, it can be seen that LIX 64N would be an appropriate complexing agent. The copper partitions into it strongly at the pH of the rinse bath, but the copper is released to the aqueous phase at the pH of the plating bath. LIX 63 would not be indicated for this process. It is a weak complexing agent, and the copper distribution coefficient at the pH of the rinse bath is so low (0.1) that little copper would partition into the organic liquid phase and the copper flux across the membrane would be very low. Kelex 100, on the other hand, is too strong a complexing agent for this plating bath. Even at the pH of this plating bath, the copper would still partition into the organic liquid phase, and the flux of copper across the membrane would again be low. With a LIX 64N-impregnated membrane under the pH conditions described above, there is a substantial flux of copper from the dilute solution into the 5 wt % copper solution. In fact, the copper flux continues until the concentration of copper in the rinse bath solution falls to approximately 50 parts per million, or 0.005 wt %. That is, the copper flows "uphill" from a dilute solution into a solution 1000-fold more concentrated.

Figure 4:
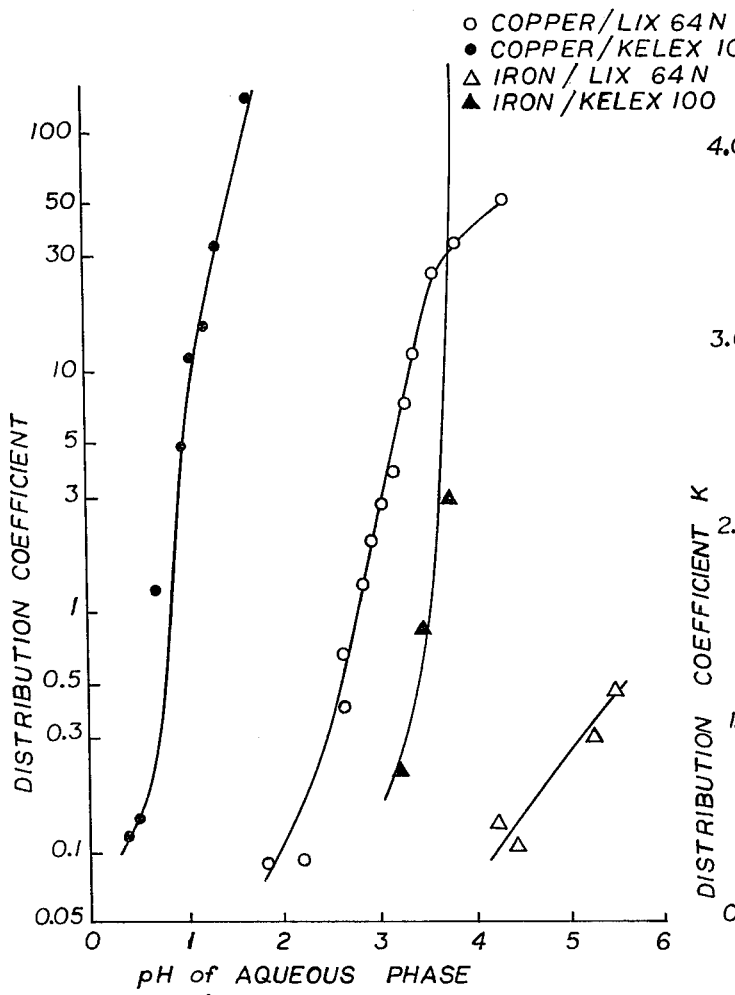

The concept of separation via a coupled transport membrane process can also be illustrated by referring to a second practical example. In the "dump leach" process of copper extraction from low grade ores, it is desired to take a feed stream containing about 0.2 wt % copper at pH 1.5 to 3.0 and with substantial iron impurity, and separate the copper from the iron and concentrate the copper to typical electrowinning tankhouse conditions: 2 wt % copper at pH 0. Thus, in this application, the copper must be both separated from iron and concentrated. FIG. 4 shows the distribution curves for both copper and iron with two complexing agents as a function of the pH of the aqueous solution. Both agents would exhibit coupled transport of copper under the conditions cited above. If the pH of the feed solution (i.e., the dump leach liquor) were less than about 2.5, Kelex 100 would be the preferred agent because the feed solution partition coefficient for LIX 64N is too low below pH 2.5. The distribution coefficient for iron with Kelex 100 at pH 2.5 or below is also favorably low. Thus, the iron flux through the membrane would be low and a clean separation could be effected. However, if the feed solution pH were between 2.5 and 3.0, the distribution coefficient for iron in Kelex 100 would be substantial and some iron would permeate the membrane along with the copper. Thus, at a feed pH below 2.5, Kelex 100 is the preferred complexing agent while above pH 2.5, LIX 64N is the preferred agent.

Figure 5:
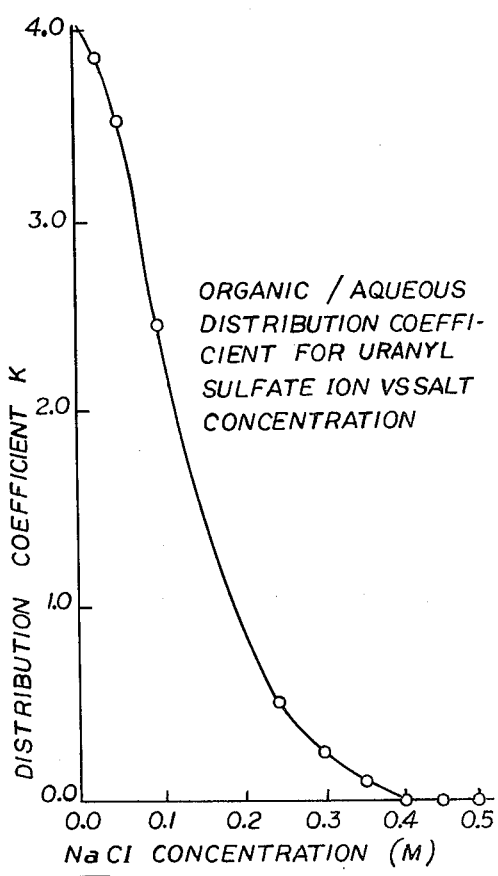

In the previously described example, the co-ion used to drive the transport of copper was hydrogen ion, i.e., the driving force was the pH gradient. This need not be the case. For example, at pH 3 uranium in dilute sulfuric acid solution exists as the complex anion $UO_2(SO_4)_2^=$. In this case, an appropriate co-ion to drive the uranyl sulfate ion in a coupled transport membrane process would be $Cl^-$, for example. FIG. 5 shows the distribution coefficient of uranium with an amine complexing agent, Alamine 336, diluted with kerosene and isodecanol, as a function of NaCl concentration in the aqueous solution. Alamine 336 is a trioctyl amine with the formula $(C_8H_{17})_3N$. A stable complex exists at an NaCl concentration below 0.1 molar, but as the concentration is increased above about 0.3 molar the uranium is driven from the organic phase. Most favorable conditions for the flux of this uranyl complex ion with Alamine 336 are thus a feed solution with a low ionic strength and a downstream solution with an ionic strength above about 0.2.

A wide range of complexing agents are available for metals. Complexing agents which are specially suitable because they are highly specific to cations in solution include, for example, certain substituted 8-hydroxyquinolines, α-hydroxy oximes, salicylaldoximes, and naphthenic acids. The 8-hydroxyquinoline compounds, which are especially useful for the separation of metals in accordance with the present process, can generally be defined by the following formula:

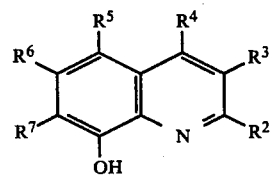

wherein each of the R groups can be hydrogen or a hydrocarbon group or inertly-substituted hydrocarbon group, such as alkenyl, alkyl, alkynyl, cycloalkyl, cycloalkenyl, aryl, or combinations thereof, such as alkaryl, aralkyl, aralkenyl, alkyl-cycloalkyl, etc. At least one of the R groups, however, must be a hydrocarbon group. Any inert substituent can be present as long as it does not adversely affect the solubility of the substituted 8-hydroxyquinoline in organic solvents or adversely affect the solubility in the organic solvent of the metal complex formed therefrom. The resulting metal complex must remain soluble at least to the extent of approximately 2% by weight in the organic solvent. The preferred position of the hydrocarbon substituent of the 8-hydroxyquinoline nuclear structure is such as to preferentially complex with the desired metal ion in the aqueous solution. The sum of the carbon atoms in the R groups must be at least about 8 and can be as high as 24 or more. The preferred R groups are alkylbenzyl groups or 8-alkenyl groups containing from 12 to 18 carbon atoms, preferably attached at the $R^3$, $R^6$, or $R^7$ position. The optimum position for substitution is at the $R_7$ position to obtain the highest affinity for the metal ion. For a more complete description of these hydrocarbon-substituted 8-hydroxyquinolines, see Republic of South Africa specification No. 69/4397 to Budde, Jr. et al., assigned to Ashland Oil, Inc.

Representative compounds useful for the complexing and within the scope of the above general formula are: 7-octylbenzyl-8-hydroxyquinoline, 7-dodecyl-benzyl-8-hydroxyquinoline, 7-nonylbenzyl-8-hydroxyquinoline, 7-ditertiarybutyl-benzyl-8-hydroxyquinoline, 7-hexadecenyl-8-hydroxyquinoline, 7-dibenzyl-8-hydroxyquinoline, 7-dimethyldicyclopentadienyl-8-hydroxyquinone, 7-phenyl-dodecenyl-8-hydroxyquinoline, and the like, where one or more of the hydrocarbon groups R are attached to ring carbon atoms in the 2nd, 3rd, 4th, 5th, and 6th positions. Mixtures of these 8-hydroxyquinoline derivatives can be used if desired.

Another preferred type of complexing agent is the class of α-hydroxy oximes, which are disclosed inter alia in U.S. Pat. Nos. 3,224,873, 3,276,863, and 3,479,378. These materials have the general formula:

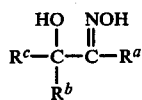

wherein the $R^a$, $R^b$, and $R^c$ groups can be any of a series of hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^b$ are also preferably the same, but, when alkyl, are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful $R^a$, $R^b$, and $R^c$ groups include, in addition to hydrogen, unsaturated groups such as heptenyl, octenyl, decenyl, octadecyl, octadecynyl, and 2-ethyl-octadecenyl. Useful alkyl groups include 2-ethylhexyl, 2, 3-diethylheptyl, 2-butyldecyl, 2-butylhexadecyl, 2, 4-ethylbutyldodecyl, 4-butylcyclohexyl, and the like. Examples of the preferred α-hydroxy oximes include 19-hydroxyhexatriaconta-9, 27-dien-18-oxime; 5, 10-diethyl-8-hydroxytetradecan-7-oxime; and 5, 8-diethyl-7-hydroxydodecane-6-oxime. Other suitable oximes include the salicylaldoximes and their derivatives. The above hydroxyquinolines and oximes are compounds generally known to industry and commercially available.

The organophosphoric acids, as represented by the formula

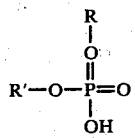

wherein R and R' may be hydrogen, aliphatic, aryl, or aralkyl and wherein not more than one R is hydrogen, are also particularly useful for cations. The term aliphatic includes branched chain radicals and alkyl or aryl substituted radicals. The term aryl includes alkyl substituted aryl radicals. The organophosphoric acids which can be used include di(2-ethylhexyl) phosphoric acid, octyl phosphoric acid, dodecyl phosphoric acid, amyl phosphoric acid, isoamyl phosphoric acid, heptadecyl-phosphoric acid, di(1-methylheptyl) phosphoric acid, di-isooctyl-phosphoric acid, di(2-ethyl-4-methylpentyl) phosphoric acid, di(2-propyl-4-methylpentyl) phosphoric acid, octylphenyl phosphoric acid, di-phenyl phosphoric acid, isooctyl or stearyl derivatives of alkyl acid phosphates, and others.

Organic amines represented by the formula

where R, R', and R" may be hydrogen, aliphatic, aryl, or alkyl can be used for the transport of anionic metal species such as uranium, vanadium, chromium, tungsten, and the like. Of course, these compounds can be used in the form of their quaternary ammonium salts.

Many of the organic complexing agents described in the previous section are liquids and, therefore, do not require any liquid carrier. However, for those which are solids or for those cases in which the metal complex and the free complexing agent are not completely miscible, a liquid solvent carrier can be used. The liquid carrier can also serve a second function. The useful complexing agents tend to be relatively viscous liquids at room temperature, and the diffusivity of the metal complex in these liquids is not generally high. By diluting the complexing agent with a liquid carrier, the viscosity is lowered and the diffusivity increased accordingly. Thus, higher fluxes of the metal complex can be achieved in the presence of the carrier even though the partitioning of metal into the liquid membrane is reduced approximately in proportion to the volume fraction of carrier liquid added.

Useful carriers include generally any inert hydrocarbons which are solvents for both the complexing agent per se and for the complexing agent-metal complex, and which do not react with any of the other materials present under the conditions of the coupled transport process. Generally, liquid aliphatic, cycloaliphatic, aromatic, cycloaliphatic-aromatic, aliphatic-aromatic hydrocarbons or chlorinated forms of these hydrocarbons are preferably utilized as the liquid carrier for the complexing agent. Optimally, the carrier has a boiling point in the range of about 50° to about 325° C. However, substantially any liquid can be used as a carrier provided that it is:

1. A solvent for the complexing agent,
2. A solvent for the complexing agent-metal complex, and
3. Immiscible with water.

Examples of suitable liquid carriers include benzene, toluene, xylene, aliphatic and aromatic petroleum fractions such as naphtha and derivatives thereof, and mixtures of the foregoing.

Certain examples of the operating conditions under which coupled transport processing is practically performed, and of the concentration and separation factors achieved, have already been described. Other examples are briefly described below.

EXAMPLE 1

Figure 6:
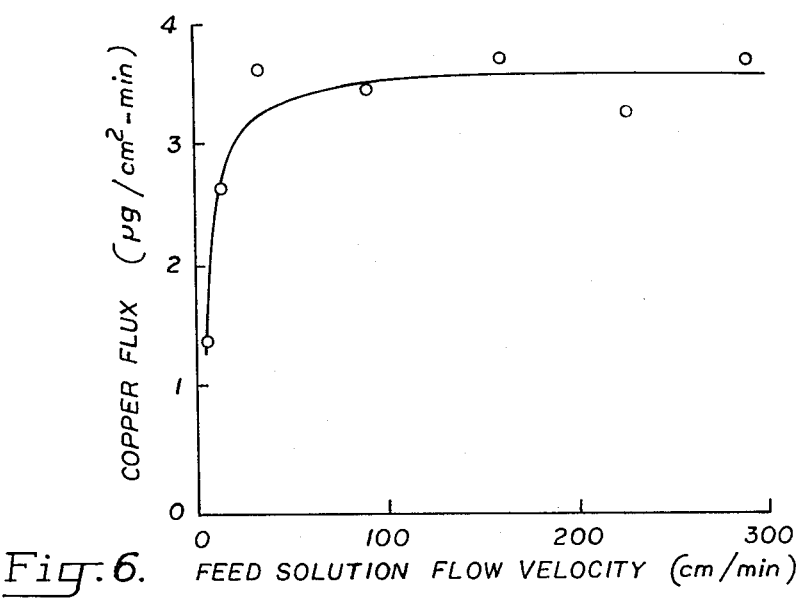

Approximately 1000 polysulfone microporous fibers made by solution spinning from dimethylformamide, and having an average wall thickness of 2-3 mils, an average internal diameter of 30-40 mils, a porosity within the range of 60 to 80%, and pore size at the membrane surfaces within the range of 0.01 to 0.02 microns, were mounted in a hollow fiber module of the type illustrated in FIG. 1. The fibers had a structure similar to that shown in FIG. 2. Average fiber length was 30 inches. The walls of the fibers were impregnated with a solution of 30 volume percent Kelex 100, a substituted 8-hydroxyquinoline produced by Ashland Chemical Co., dissolved in Kermac 470B, a hydrocarbon distillate produced by Kerr-McGee. An aqueous feed solution containing 0.2 wt % copper and having a pH of 1.7 was circulated through the lumens of the fibers at a velocity ranging from 50 cm/min to greater than 1500 cm/min. The aqueous product solution was 2 wt % copper dissolved in 1 molar sulfuric acid. At a recirculation velocity above approximately 300 to 400 cm/min, the copper flux was essentially constant at approximately 3.2 μg of copper/cm$^2$- min. At lower recirculation velocities through the fibers, the copper flux was considerably affected by concentration polarization, and the flux was reduced considerably. These results are shown graphically in FIG. 6. When the feed solution was maintained at 300 cm/min, and the product solution recirculated at varied rates, the flux through the membranes remained substantially unaltered, even when the velocity of the product solution on the outside of the fibers dropped to as low as 5 cm/min. The above demonstrates the importance of proper control of concentration polarization in the aqueous feed solution.

EXAMPLE 2

2000 mil of an aqueous feed solution containing 0.2 wt % copper and having a pH of 2.5 was circulated through the lumens of the fibers in a module prepared as in Example 1, at a rate of 2000 cm/min. A product solution of 2 wt % copper in 1 molar sulfuric acid was circulated around the outside of the fibers. The concentration of copper in the aqueous feed solution fell rapidly to 0.1 wt % after approximately 90 minutes, 0.05 wt % after 150 minutes, and 0.02 wt % after approximately 240 minutes.

EXAMPLE 3

Approximately 700 polysulfone microporous fibers of the type described in Example 1 were mounted in a fiber module as shown n FIG. 1. The microporous walls of the fibers were impregnated with a solution of 30 volume percent Kelex 100 in Kermac 470B. A simulated copper leach solution buffered at pH 2.5, and containing 0.2 wt % copper, was circulated through the lumens of the fibers at an average linear velocity of 50 cm/min. A 2 wt % aqueous copper solution in 1 molar $H_2SO_4$ was circulated on the outside of the fibers at a linear velocity of approximately 5 to 10 cm/min. Over a period of 45 days the flux range fell from an initial value of approximately 4 $\mu g/cm^2$-min to approximately 1.5 to 2.0 $\mu g/cm^2$-min. At 45 days the feed flow rate was increased in steps up to a inear velocity of 300 cm/min. As the flow rate was increased the flux also increased up to a value of about 10 $\mu g/cm^2$-min. The above demonstrates that complex-containing liquids can be maintained within the microporous walls of the fibers for prolonged periods of time.

EXAMPLE 4

Approximately 1200 polysulfone microporous fibers as described in Example 1 were mounted in a fiber module of the type illustrated in FIG. 1. The microporous walls of the fibers were filled with a solution of LIX 64N. A copper dump leach solution having a pH of 2.0 to 2.5 and a copper concentration of 0.12 wt %, was employed as aqueous feed solution and was circulated through the lumens of the fibers at a velocity of 700 cm/min. An aqueous product solution containing approximately 4 wt % copper dissolved in approximately 150 g/liter sulfuric acid was circulated on the outside of the fibers at a velocity of 50 cm/min. A copper flux of approximately 3 $\mu g/cm^2$-min through the fibers was obtained.

EXAMPLE 5

Using a fiber module as described in Example 1, an aqueous feed solution containing 0.2 wt % copper and 0.1 wt % (ferric) iron at a pH of 2.5 was circulated through the fiber lumens at approximately 700 cm/min. An aqueous product solution of approximately 100 g/liter sulfuric acid was circulated on the outside of the fibers, at a rate of approximately 10 cm/min. An initial copper flux through the fibers of almost 7 $\mu g/cm^2$-min was noted, and the iron flux was less than 0.01 $\mu g/cm^2$-min. When 90% of the copper in the aqueous feed solution had passed through the fiber walls, the copper flux had dropped to approximately 3.8 $\mu g/cm^2$-min, while the iron flux was approximately 0.02 $\mu g/cm^2$-min.

EXAMPLE 6

Using a polysulfone hollow fiber module similar to the one described in Example 1, an aqueous feed solution of 0.2 wt % copper at a pH of 2.5 was circulated through the lumens of the fibers at a velocity of 720 cm/min. An aqueous product solution of 2 wt % copper dissolved in 100 g/liter sulfuric acid was circulated on the outside of the fibers at a velocity of 60 cm/min. After a stabilization period of about 1 hour, a copper flux of 3 $\mu g/cm^2$-min was obtained. The aqueous feed and product solutions were then interchanged, with the aqueous feed solution circulated around the outside of the fibers at 60 cm/min, and the aqueous product solution circulated through the lumens of the fibers at 720 cm/min. The copper flux as a consequence dropped to 0.2 $\mu g/cm^2$-min.

I claim:

1. A process for extraction of selected ions of metals from an aqueous feed solution and deposition of said ions in an aqueous product solution comprising:

circulating said feed solution into the lumens of a multiplicity of hollow fibers, the walls of said fibers consisting essentially of a microporous anisotropic membrane having pores of about 0.01 to 0.04 micron in diameter at each surface and pores of about 2 to 10 microns in diameter in the interior, and said membrane having a water-immiscible organic liquid comprising a complexing agent specific for said ions substantially completely filling, and retained within, the pores thereof, and circulating said aqueous product solution over the outer sides of said fibers, whereby a complex is formed between said complexing agent and said ions in the feed solution followed by diffusion of said complex through the organic liquid in the pores of the membrane, and subsequent liberation of said ions in the product solution.

2. The process of claim 1 in which said anisotropic membrane consists essentially of polysulfone.

3. The process of claim 1 in which the hollow fibers have internal diameters no greater than about 50 mils.

4. The process of claim 1 in which the hollow fibers have walls of a thickness of 10 mils or less.

5. The process of claim 1 in which the selected ions are metallic cations.

6. The process of claim 5 in which the cations are copper ions.

7. The process of claim 1 in which the selected ions are metallic anions.

8. The process of claim 7 in which the anions are uranyl sulfate ions.

9. The process of claim 1 in which the water-immiscible organic liquid consists essentially of said complexing agent.

10. The process of claim 1 in which the water-immiscible organic liquid comprises a solution of said complexing agent in an organic liquid carrier.

* * * * *